(12) United States Patent
Schoeny et al.

(10) Patent No.: US 11,477,933 B2
(45) Date of Patent: Oct. 25, 2022

(54) TRENCH DETECTION SYSTEM FOR AN AGRICULTURAL IMPLEMENT

(71) Applicant: CNH Industrial America LLC, New Holland, PA (US)

(72) Inventors: Christopher Schoeny, Yorkville, IL (US); Trevor Stanhope, Palos Hills, IL (US)

(73) Assignee: CNH Industrial America LLC

(*) Notice: Subject to any disclaimer, the term of this patent is extended or adjusted under 35 U.S.C. 154(b) by 686 days.

(21) Appl. No.: 16/190,831

(22) Filed: Nov. 14, 2018

(65) Prior Publication Data

US 2020/0146200 A1    May 14, 2020

(51) Int. Cl.
| | | |
|---|---|---|
| *A01B 63/24* | (2006.01) | |
| *A01C 5/06* | (2006.01) | |
| *A01B 63/16* | (2006.01) | |
| *A01C 7/08* | (2006.01) | |

(52) U.S. Cl.
CPC .............. *A01B 63/24* (2013.01); *A01C 5/064* (2013.01); *A01C 5/068* (2013.01); *A01B 63/16* (2013.01); *A01C 7/08* (2013.01)

(58) Field of Classification Search
CPC ........... A01B 63/24; A01B 63/16; A01C 7/08; A01C 5/064; A01C 5/068; E02F 5/12; E02F 5/14; E02F 5/145; E02F 9/26; E02F 9/261; E02F 9/262; E02F 9/264; E02F 9/265; E02F 9/267; E02F 9/268
See application file for complete search history.

(56) References Cited

U.S. PATENT DOCUMENTS

| | | | |
|---|---|---|---|
| 5,426,972 A * | 6/1995 | Heirtzler | G01N 3/30 405/271 |
| 6,530,334 B2 | 3/2003 | Hagny | |
| 6,848,377 B2 | 2/2005 | Rylander et al. | |
| 6,907,336 B2 * | 6/2005 | Gray | A01B 69/008 701/50 |
| 7,010,425 B2 * | 3/2006 | Gray | A01B 69/008 172/2 |
| 7,438,006 B2 | 10/2008 | Mariman et al. | |
| 7,689,394 B2 * | 3/2010 | Furem | E02F 9/267 703/8 |
| 7,908,062 B2 * | 3/2011 | Corcoran | E02D 1/027 701/50 |
| 8,763,713 B2 | 7/2014 | Bassett | |
| 8,935,986 B2 | 1/2015 | Blomme et al. | |
| 8,985,232 B2 | 3/2015 | Bassett | |
| 9,173,339 B2 | 11/2015 | Sauder et al. | |
| 9,585,302 B2 | 3/2017 | Anderson | |
| 9,686,900 B2 | 6/2017 | Raetzman et al. | |
| 10,738,441 B2 * | 8/2020 | Lindskov | E02F 9/2029 |
| 2005/0158129 A1 * | 7/2005 | Chi | E02D 3/00 405/271 |

(Continued)

*Primary Examiner* — Jamie L McGowan
(74) *Attorney, Agent, or Firm* — Rebecca L. Henkel; Rickard K. Demille

(57) ABSTRACT

A trench detection system for an agricultural implement includes a row unit configured to form a trench in soil, to deposit an agricultural product in the trench, and to at least partially close the trench after deposition of the agricultural product. The trench detection system also includes a tactile probe assembly behind the row unit that, in operation, contacts the soil after closure of the trench and generates a signal indicative of a quality of the closure.

19 Claims, 6 Drawing Sheets

(56) References Cited

U.S. PATENT DOCUMENTS

| | | | |
|---|---|---|---|
| 2010/0180808 A1* | 7/2010 | Liu | A01C 7/205 |
| | | | 111/130 |
| 2014/0116735 A1* | 5/2014 | Bassett | A01B 63/008 |
| | | | 172/2 |
| 2014/0172247 A1* | 6/2014 | Thomson | A01B 63/112 |
| | | | 701/50 |
| 2014/0303854 A1* | 10/2014 | Zielke | G01K 1/14 |
| | | | 701/50 |
| 2016/0029547 A1 | 2/2016 | Casper et al. | |
| 2016/0165789 A1* | 6/2016 | Gervais | A01C 7/205 |
| | | | 700/275 |
| 2017/0094889 A1 | 4/2017 | Garner et al. | |
| 2017/0260701 A1* | 9/2017 | Leo | E01C 19/48 |
| 2019/0075710 A1* | 3/2019 | Strnad | A01C 5/066 |
| 2019/0380259 A1* | 12/2019 | Frank | A01C 5/068 |
| 2020/0032490 A1* | 1/2020 | Ready-Campbell | E02F 9/205 |

\* cited by examiner

TRENCH DETECTION SYSTEM FOR AN AGRICULTURAL IMPLEMENT

BACKGROUND

The disclosure relates generally to a trench detection system for an agricultural implement.

Generally, agricultural implements are towed behind a work vehicle, such as a tractor. The agricultural implements generally contain a particulate material, such as seeds, fertilizer, and/or other agricultural product, which is distributed on or in the ground using various methods. For example, certain implements form a trench in the ground, deposit a seed in the trench, and then close the trench over the seed. Proper closure of the trench may enhance seed germination and crop production. In some instances, the trench may not properly close due to soil conditions, rocks, residue buildup, and other impediments.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a trench detection system for an agricultural implement includes a row unit configured to form a trench in soil, to deposit an agricultural product in the trench, and to at least partially close the trench after deposition of the agricultural product. The trench detection system also includes a tactile probe assembly behind the row unit that, in operation, contacts the soil after closure of the trench and generates a signal indicative of a quality of the closure.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a trench detection system for an agricultural implement and/or a work vehicle. Certain agricultural implements are towed by a work vehicle and are configured to open a trench in a field, deposit a seed, and close the trench. For example, certain agricultural implements include row units that form trenches along rows of the field, deposit seeds in the trenches, and close the trenches. Certain agricultural implements and/or row units of the agricultural implements include a tactile probe assembly that detects a quality of the closure of the trench. The tactile probe assembly outputs signals indicative of the quality of the closure to a controller of the trench detection system. In response to receiving the signals, the controller outputs a signal to notify an operator of the agricultural implement of the quality of the closure and/or outputs a signal to perform a control operation. The control operation may include adjusting a relative position of and/or a pressure applied to residue managers of the row unit, gauge wheels of the row unit, closing disks of the row unit, a press wheel of the row unit, or a combination thereof. As such, certain embodiments of the trench detection system are configured to detect the quality of the trench closure for each row unit, perform control operations at each row unit, and notify the operator of the quality of the trench closure at each row unit.

Figure 1:
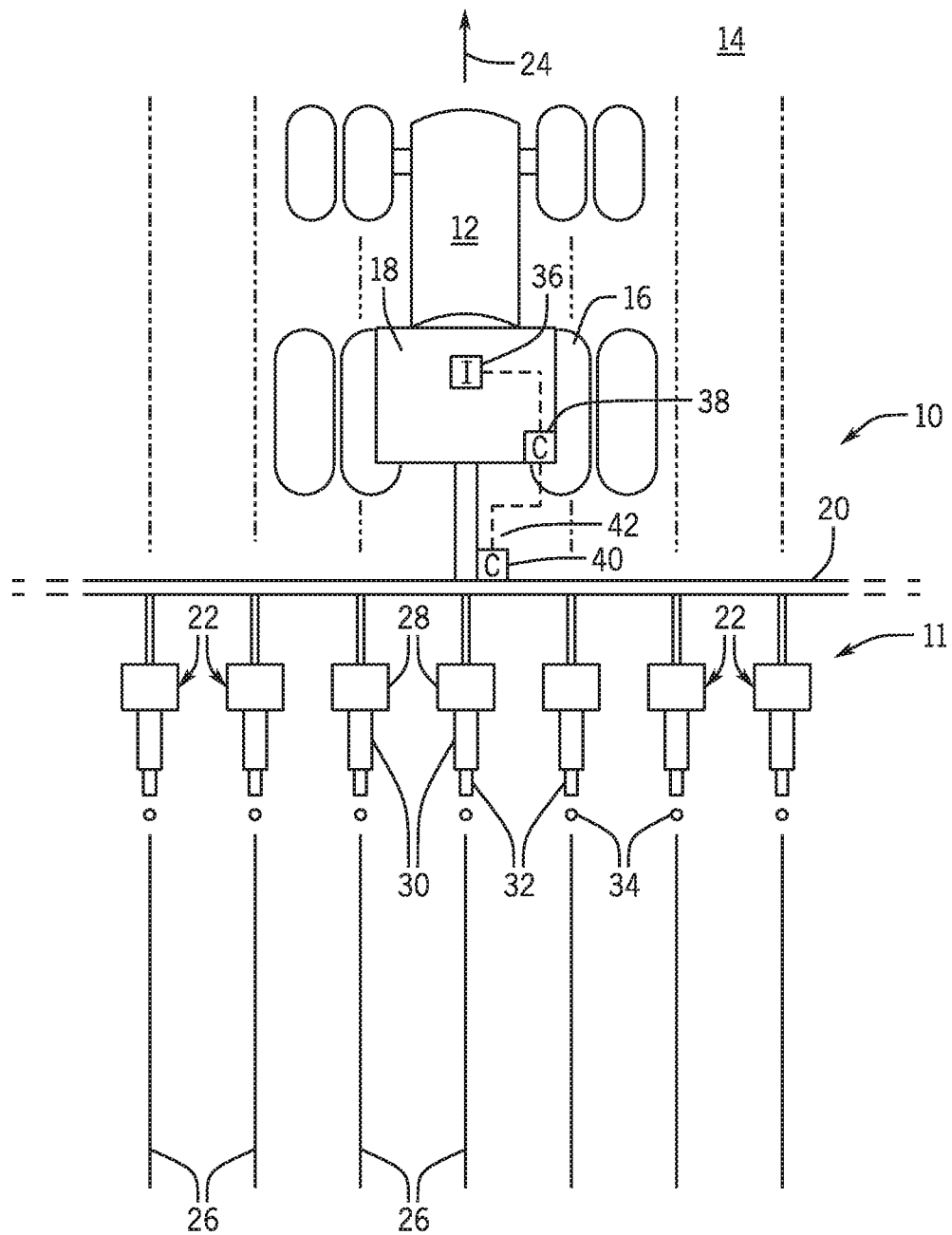
FIG. 1 is a top view of an embodiment of a work vehicle and an agricultural implement disposed in a field and having a trench detection system, in accordance with an aspect of the present disclosure.

With the foregoing in mind, the present embodiments relating to a trench detection system may be utilized in any suitable agricultural implement and/or work vehicle. For example, FIG. 1 is a top view of an embodiment of a trench detection system 10 of an agricultural implement 11 and a work vehicle 12. As illustrated, the agricultural implement 11 is coupled to the work vehicle 12. The agricultural implement 11 and the work vehicle 12 are disposed in a field 14. The work vehicle 12 includes drive wheels 16 that rotate to move the work vehicle 12 through the field 14. In certain embodiments, the work vehicle 12 may include other travel mechanisms (i.e., a track system) to move the work vehicle 12. The work vehicle 12 also includes a cab 18 that houses an operator of the agricultural implement 11 and the work vehicle 12. For example, the operator may be positioned in the cab 18 while the work vehicle 12 moves through the field 14. The agricultural implement 11 includes a frame 20 coupled to row units 22. As illustrated, the work vehicle 12 is coupled to the frame 20. As such, the work vehicle 12 may tow the agricultural implement 11, via the frame 20, through the field 14 in a direction 24.

Each row unit 22 is configured to form a row 26 in the field 14 (i.e., a trench, furrow, cut, and/or opening in a seedbed) as the agricultural implement 11 is towed through the field 14. For example, each row unit 22 may include opening disks that penetrate the soil of the field 14 to form the row 26. After forming the row 26, a seed delivery system 28 of each respective row unit 22 delivers seeds to the row 26 (i.e., into the trench). The seeds may be any agricultural product that may mature into a harvestable crop. In certain embodiments, the row unit 22 may deliver other agricultural products (e.g., fertilizer) to the row. After delivery of the seeds and/or the other agricultural products to the row 26, closing disks 30 of each respective row unit 22 displace soil into the row 26 and over the seeds. The closing disks 30 may partially or completely fill the row 26 with the soil. After closing the row 26, a press wheel 32 of each respective row unit 22 rolls over and along the row 26 to further close the row 26 and/or to compact the soil over the seed. In the illustrated embodiment, each row unit 22 includes the closing disks 30 and the press wheel 32. In certain embodiments, some or all of the row units 22 may include only the closing disks 30 or only the press wheel 32 to close the row 26 after deposition of the seeds.

As illustrated, the trench detection system 10 and each row unit 22 includes a sensor 34 disposed adjacent to the press wheel 32. After the row units 22 close each of the respective rows 26, each of the respective sensors 34 detects the quality of the closure at each row 26. For example, the sensors 34 may be tactile probe assemblies and may detect whether each row 26 is properly closed or improperly closed. Based on the detected quality of the closure at the row units 22, the sensors 34 may output signals indicative of the quality of the closure to a controller of the trench detection system 10.

The work vehicle 12 includes a user interface 36 and a work vehicle controller 38. As illustrated, the user interface 36 and the work vehicle controller 38 are disposed in the cab 18 of the work vehicle 12. In certain embodiments, the user interface 36 and/or the work vehicle controller 38 may be disposed remotely from the work vehicle 12. The work vehicle controller 38 may control certain operations of the work vehicle 12 and/or the trench detection system 10. The agricultural implement 11 includes an agricultural implement controller 40. The agricultural implement controller 40 may control certain operations of the agricultural implement 11 and/or the trench detection system 10. In certain embodiments, one or more of the row units 22 may include row unit controllers that control certain operations of the row units 22 and/or the trench detection system 10. The operator disposed in the cab 18 or disposed remotely may interact with the user interface 36 to control the trench detection system 10, the agricultural implement 11, the work vehicle 12, or a combination thereof. For example, the user interface 36 may display values indicative of the quality of the closure at each row unit 22 and/or may display selectable options for operating modes of the trench detection system 10.

As illustrated, the user interface 36, the work vehicle controller 38, and the agricultural implement controller 40 are connected via a network 42. The network 42 may include a wired connection (e.g., Ethernet, universal serial bus (USB), CANbus, ISObus, etc.) and/or a wireless connection (e.g., Wi-Fi, Bluetooth, etc.) between the user interface 36, the work vehicle controller 38, the agricultural implement controller 40, other components of the trench detection system 10 (e.g., the row units 22), or a combination thereof. As such, the network 42 enables the user interface 36, the work vehicle controller 38, the agricultural implement controller 40, the other components of the trench detection system 10, or the combination thereof, to communicate via wired and/or wireless signals.

The work vehicle controller 38 and/or the agricultural implement controller 40 may receive the signals indicative of the quality of the closure as output by the sensors 34. In certain embodiments, the signals output by the sensors 34 may pass through and/or be processed by the respective row unit controllers prior to being received by the work vehicle controller 38 and/or the agricultural implement controller 40. For example, a respective row unit controller may receive signals from a respective sensor 34, may process the signals through a filter, and may output signals indicative of the quality of the closure to the work vehicle controller 38 or the agricultural implement controller 40. Alternatively or additionally, some or all row units 22 may include multiple row unit controllers. For example, a respective row unit 22 may include a first row unit controller that monitors the quality of the closure at a respective row 26 based on the signals from the sensors 34. The first controller may pass a signal indicative of the quality of the closure to a second row unit controller of the row unit 22 (e.g., via the CAN network). The second row unit controller may act as a gateway to the work vehicle controller 38 and/or the agricultural implement controller 40 and may output a signal indicative of the quality of the closure to the work vehicle controller 38 and/or the agricultural implement controller 40. Based on the quality of the closure, the work vehicle controller 38 or the agricultural implement controller 40 may output a signal to the user interface 36 to notify the operator of the quality of the closure. Additionally, based on the quality of the closure, the work vehicle controller 38 or the agricultural implement controller 40 may output a signal to the respective row unit 22 (e.g., to the row unit controller of the row unit 22) indicative of adjustment to the closing disks 30 and/or the press wheel 32 of the respective row unit 22. In response, the row unit controller may perform the adjustment. In an embodiment with the first and second row unit controllers, the first or second row unit controller may perform the adjustment.

As described herein, the quality of the closure of each row 26 may affect the ability of the seeds to germinate and emerge as quickly as possible. For example, if there is not enough soil deposited on top of the seeds, the seeds may yield lower germination and emergence rates. As such, the ability of the sensors 34 to detect the quality of the closure of the rows 26 may enable the trench detection system 10 to increase the germination and emergence rates of the crop seedlings by automatically adjusting an aspect of the closing system and/or by notifying the operator of the quality of the closure of the rows 26.

Figure 2:
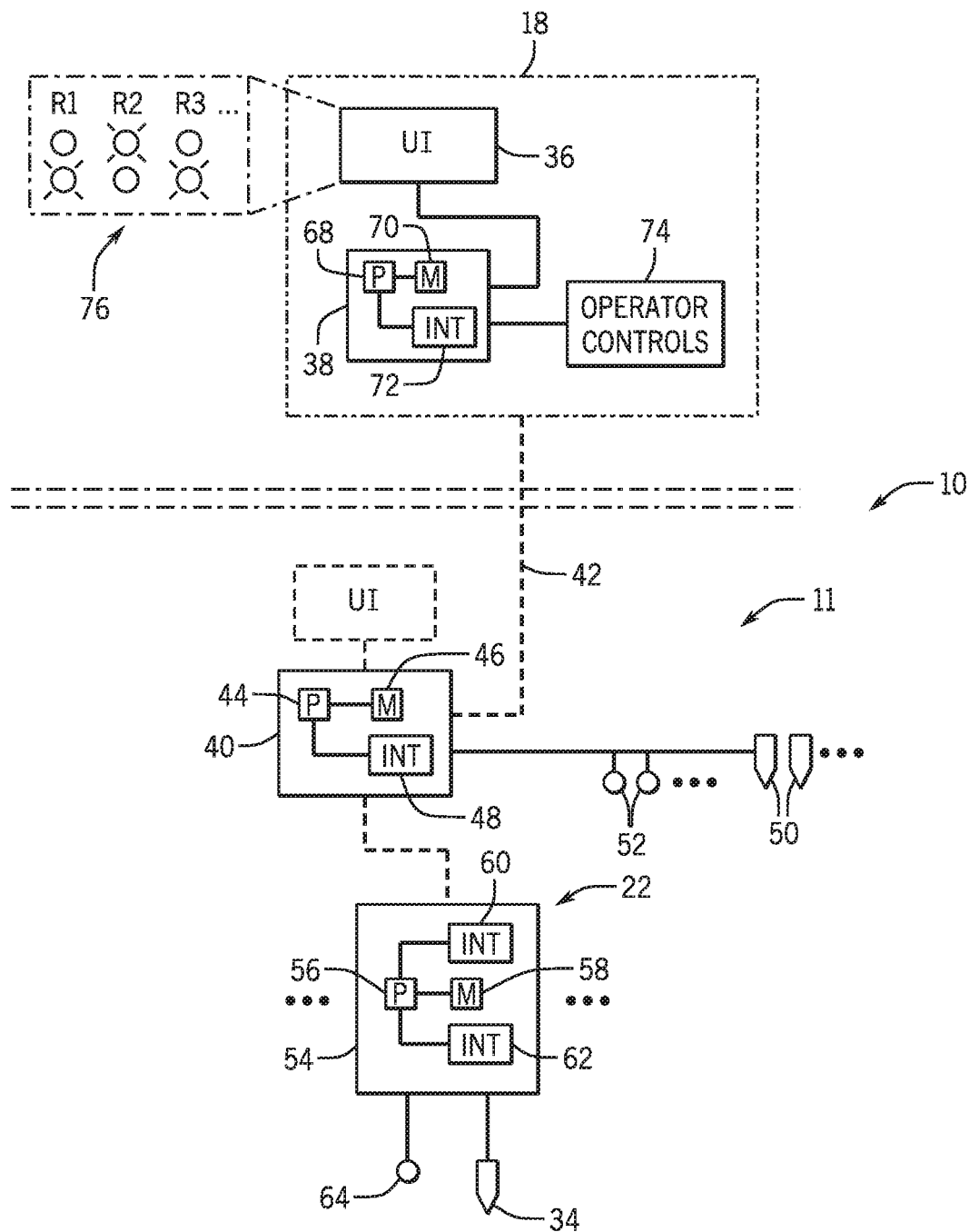
FIG. 2 is a schematic view of the trench detection system of FIG. 1, in accordance with an aspect of the present disclosure.

FIG. 2 is a schematic view of the trench detection system 10 of FIG. 1. As illustrated, the trench detection system 10 includes the work vehicle controller 38 disposed generally in the cab 18 of the work vehicle and the agricultural implement controller 40 of the agricultural implement 11. The agricultural implement controller 40 includes a processor 44, a memory 46, and an interface 48. The agricultural implement controller 40 is configured to control operations and measure parameters of the agricultural implement 11. For example, the agricultural implement controller 40 may receive signals from implement sensors 50 at the processor 44 and via the interface 48. The implement sensors 50 may include sensors that detect various parameters associated with operation of the implement 11. For example, the implement sensors 50 may detect a tire pressure, a pressure (e.g., an air pressure and/or a hydraulic pressure at a supply source or in a supply line) supplied to one or more row units 22, an amperage and/or a voltage of a power supply source and/or a power supply line providing power to one or more row units 22, and other parameters associated with the operation of the agricultural implement 11. Such measured parameters may be stored in the memory 46.

The agricultural implement controller 40 may also output signals to implement actuators 52 via the processor 44 and the interface 48. The implement actuators 52 may include actuators that modify aspects of certain components of the agricultural implement 11. For example, the implement actuators 52 may adjust positions of certain implement components, a tire pressure, and other parameters associated with the operation of the agricultural implement 11. In certain embodiments, the processor 44 may execute instructions stored in the memory 46 to output signals to the implement actuators 52. The signals output to the implement actuators 52 may be in response to the signals received from the implement sensors 50.

As illustrated, the trench detection system 10 includes a row unit controller 54 at the row unit 22 of the agricultural implement 11. The agricultural implement 11 may include a respective row unit controller 54 at some or all of the row units 22. The row unit controller 54 includes a processor 56, a memory 58, a first interface 60, and a second interface 62. The row unit controller 54 is configured to control operations and/or measure parameters of the row unit 22. For example, as illustrated, the row unit controller 54 is coupled to the sensor 34 and row unit actuators 64. As described herein, the sensor 34 is configured to detect certain parameters associated with the row unit 22. For example, the sensor 34 may detect the quality of the closure of the trench formed by the row unit 22. The sensor 34 may output signals to the row unit controller 54 indicative of the quality of the closure of the trench. The signals output by the sensor 34 may be received by the processor 56 via the second interface 62. For example, the second interface 62 may be a CAN network interface, analog/digital input, and/or another type of interface configured to transmit the signal. In response, the processor 56 may output signals to the work vehicle controller 38 and/or the agricultural implement controller 40 via the first interface 38. In certain embodiments, the measurements detected by the sensor 34 may be stored in the memory 58 of the row unit controller 54.

As described above, in certain embodiments, the row unit 22 may include first and second controllers that may communicate with one another. For example, the row unit 22 may include another controller in addition to the row unit controller 54 or two other controllers in place of the row unit controller 54. A first row unit controller (e.g., the row unit controller 54 or another first row unit controller) may act as a gateway to the work vehicle controller 38 and/or to the agricultural implement controller 40 and may output a signal indicative of the quality of the closure to the work vehicle controller 38 and/or to the agricultural implement controller 40. In certain embodiments, the first row unit controller may receive instructions from the work vehicle controller 38 and/or to the agricultural implement controller 40. A second row unit controller (e.g., the row unit controller 54 or another second row unit controller) may receive the sensor signals from the sensor 34 and may pass the signal along to the first row unit controller. The second row unit controller may also perform the control operations as described herein (e.g., adjust the row unit actuators 64). Further, the first row unit controller may pass along the instructions received from the work vehicle controller 38 and/or from the agricultural implement controller 40 to the second row unit controller. In some embodiments, the first and second controllers may be disposed at separate row units 22.

The row unit actuators 64 may include actuators that modify aspects of certain components of the row unit 22. For example, the row unit actuators 64 may adjust the down force applied to the closing disks, the spacing/gap between the closing disks, a down force applied to the press wheel, and other parameters associated with the operation of the row unit 22. In certain embodiments, the row unit actuators 64 may adjust certain aspects of the row unit components based on the signals received from the sensor 34. For example, based on the signal indicative of the quality of the closure of the trench received from the sensor 34, the processor 56 may execute instructions stored in the memory 58 to output signals to the row unit actuators 64 to cause the row unit actuators 64 to change the respective positions of certain row unit components.

As illustrated, the work vehicle controller 38 includes a processor 68, a memory 70, and an interface 72. The work vehicle controller 38 is configured to control certain parameters associated with the operation of the trench detection system 10 and/or the work vehicle. For example, the work vehicle controller 38 may receive signals from the agricultural implement controller 40 and/or the row unit controller 54 indicative of the quality of the closure of the trench and may receive other parameters associated with the operation of the agricultural implement 11 and/or the work vehicle 12. Such signals may be received at the processor 68 via the interface 72. In certain embodiments, the work vehicle controller 38 may receive signals directly from the sensor 34 and/or output signals directly to the row unit actuators 64. The parameters indicated by the signals and received by the work vehicle controller 38 may be stored in the memory 70.

Based on the signals received from the sensor 34, any controller of the work vehicle controller 38, the agricultural implement controller 40, or the row unit controller 54 may determine an indication to be displayed on the user interface 36 and/or may determine a control operation. By way of example, the controller may receive the signal indicative of the quality of the closure of the trench at the row unit 22. Based on the received signal, the controller may determine whether the quality of the closure is sufficient by comparing the measurement to a reference value. The reference value may include reference grades established by the operator or determined by the controller based on certain conditions (i.e., based on a signal received from another sensor of the row unit 22). The controller may also consider tolerance ranges relative to the reference grades when comparing the measurement. For example, the controller may determine whether the measurement is within a given tolerance range. Based on the comparison, the controller may output signals to communicate the quality of the closure to the operator and/or to perform a control operation at the row unit 22.

In the illustrated embodiment, the work vehicle controller 38 is communicatively coupled to the user interface 36 and operator controls 74. The user interface 36 may display certain parameters measured by the trench detection system 10 and/or certain determinations made by the trench detection system 10. For example, as illustrated, the user interface 36 includes visual indicators 76 that may be detectable by a user (e.g., the operator). The visual indicators 76 show whether the quality of the closure of the trench for individual rows is sufficient. Each row formed by the row units 22 and in the field corresponds to a set of two visual indicators (e.g., R1, R2, R3, etc.). A first visual indicator 76 of a set of two visual indicators 76 indicates sufficient trench closure at the respective row, and a second visual indicator 76 of the set of two visual indicators 76 indicates insufficient trench closure at the respective row. In certain embodiments, the user interface 36 may include other user-detectable indicators, in addition to or instead of the visual indicators 76, indicative of the quality of the trench closure at each respective row. For example, the user interface 36 may include a bar graph that displays individual bars representing each row in the field and the quality of the closure for each row. Each bar may color-coded such that certain colors communicate the quality of the closure (i.e., a red bar may indicate unacceptable trench closure). The user interface 36 may include a map drawn in real time that indicates the rows formed by each row unit 22 and may indicate to the operator when a respective row is not properly closed. Further, the user interface 36 may include certain alerts (e.g., a pop-up window) that indicate improper closure of the respective row. In certain embodiments, the work vehicle controller 38 or the agricultural implement controller 40 may include the user interface 36.

The operator controls 74 may include certain mechanisms that enable the operator to adjust parameters of the agricultural implement 11 and individual row units 22. For example, after viewing the visual indicators 76 and/or the other user-detectable indicators, the operator may make an adjustment to an individual row unit 22 based on the visual indicators 76. Such an adjustment may include adjustments to the pressure applied to the closing disks, the spacing between the closing disks, the pressure applied to the press wheel, the pressure applied to the gauge wheels, the pressure applied to the residue managers, and other parameters associated with the operation of the row unit 22. In certain embodiments, the work vehicle controller 38 may output signals indicative of such adjustments based on the operator inputs received at the operator controls 74. In some embodiments, the operator controls 74 may be included within the user interface 36.

As described above, the trench detection system 10 includes a processor (e.g., the processor 44, the processor 56, and the processor 68) and a memory (e.g., the memory 46, the memory 58, and the memory 70). In some embodiments, each memory may include one or more tangible, non-transitory, computer-readable media that store instructions executable by the corresponding processor and/or data to be processed by the corresponding processor. Each memory may include random access memory (RAM), read-only memory (ROM), rewritable non-volatile memory (e.g., flash memory), hard drives, optical discs, or a combination thereof. The processors may include general-purpose microprocessors, one or more application specific integrated circuits (ASICs), one or more field programmable gate arrays (FPGAs), or a combination thereof.

Figure 3:
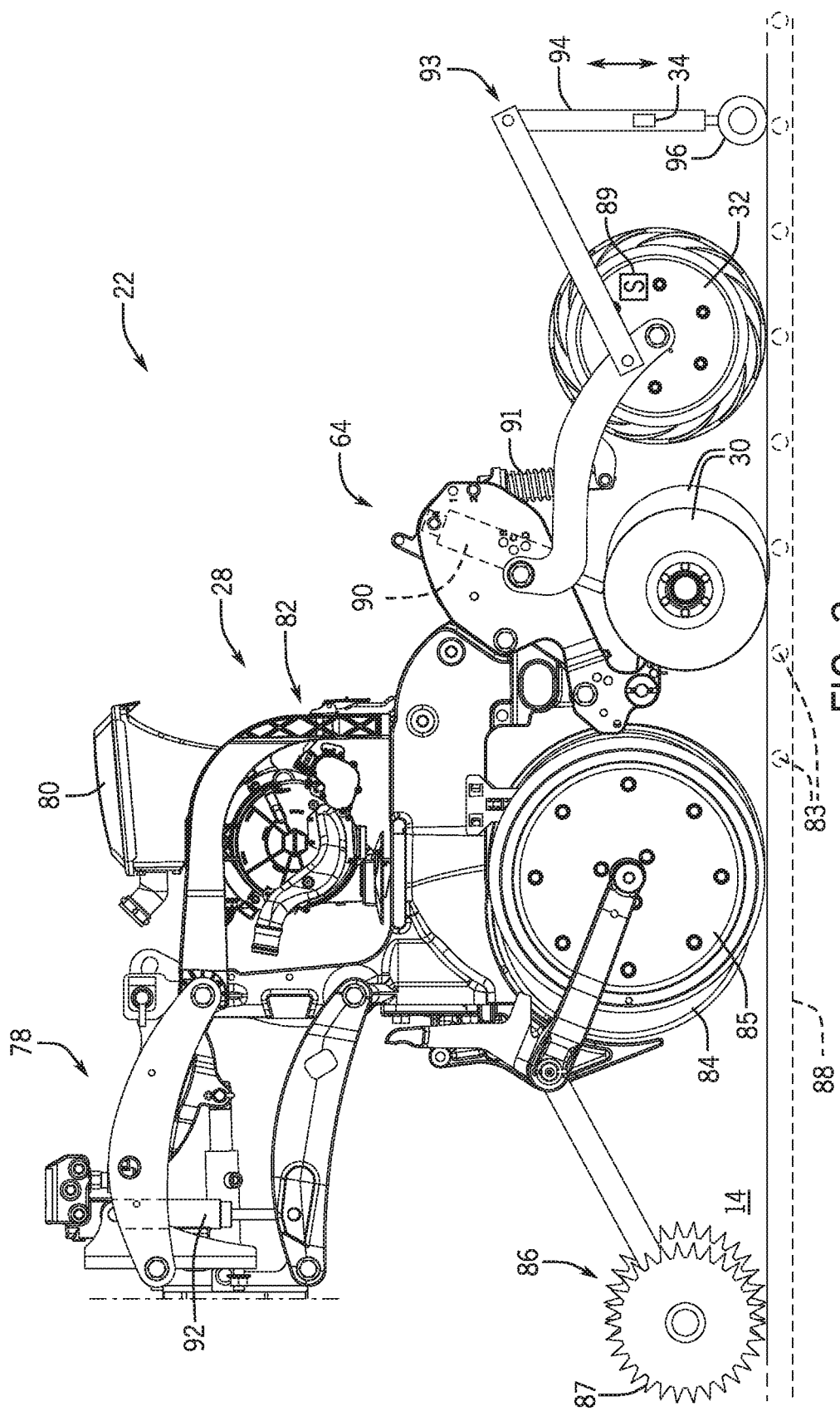
FIG. 3 is a side view of a row unit of the agricultural implement of FIG. 1, in accordance with an aspect of the present disclosure.

FIG. 3 is a side view of the row unit 22 of the agricultural implement of FIG. 1. As illustrated, the row unit 22 includes a linkage assembly 78 that couples the row unit 22 to the frame of the agricultural implement. As the agricultural implement is towed through the field 14, the row unit 22 is also towed through the field 14. The row unit 22 is configured to deposit seeds into the field 14. For example, the row unit 22 includes the seed delivery system 28. The seed delivery system 28 includes a hopper 80 and a seed distribution system 82. The hopper 80 stores seeds 83 for deposition by the row unit 22. In certain embodiments, multiple row units 22 may share a single hopper. The seed distribution system 82 delivers the seeds 83 from the hopper 80 to the field 14. The seed distribution system 82 may include a metering system that meters the seeds 83 in a predetermined fashion. For example, the metering system may include a vacuum, a mechanical metering wheel, other metering mechanisms, or a combination thereof.

As illustrated, the row unit 22 includes opening disks 84 and gauge wheels 85. Each of the two opening disks 84 is coupled to a respective gauge wheel 85. The opening disks 84 penetrate a top surface of the field 14 to form a trench 88 along the row of the row unit 22. The gauge wheels 85 rotate along the top surface of the field 14 beside the row and provide a reference level from which the opening disks 84 form the trench 88. For example, the opening disks 84 and/or the gauge wheels 85 may be vertically adjustable to enable the operator set a desired depth of the trench 88. As the opening disks 84 penetrate the field 14, the trench 88 is formed in the soil.

As illustrated, the row unit 22 includes a residue management system 86 positioned generally in front of the opening disks 84 and the gauge wheels 85. The residue management system 86 includes residue managers 87 (e.g., rolling tines, blades, or discs) that clear the surface of the field 14 of residue (e.g., clods, debris, etc.) as the row unit 22 moves over the surface. The residue managers 87 are coupled to the row unit 22 via linkages in front of and adjacent to the gauge wheels 85 (e.g., generally below the linkage assembly 78). As the row unit 22 travels across the field 14, the residue managers 87 may rotate and conform the soil of the field 14 in a manner that enables the opening discs 84 to create the trench 88. For example, the residue managers 87 may break apart clods of the soil, move debris out of a pathway of the row unit 22, level out the soil, or a combination thereof. The residue managers 87 may engage and penetrate the soil to manage the residue. In certain embodiments, the residue management system 86 may include other mechanisms in addition to or instead of the residue managers 87 that engage the soil and manage the residue.

As illustrated, the row unit 22 includes the closing disks 30 and the press wheel 32. The closing disks 30 and the press wheel 32 may form a two-stage closing system of the row unit 22. In the illustrated embodiment, the closing disks 30 include a closing disk 30 disposed on each side of the trench 88. The pair of closing disks 30 are axially offset such that a first closing disk 30 penetrates, fractures, and/or mixes the soil from a first side of the trench 88 into the trench 88, and then a second closing disk 30 penetrates, fractures, and/or mixes the soil from a second side of the trench 88 into the trench 88. In certain embodiments, the closing disks 30 may be axially aligned and not offset. The closing disks 30 may also be axially separated by a spacing/gap that is fixed or adjustable for each row unit. Additionally, each closing disk 30 may be disposed at angle relative to the trench 88. For example, the top ends of the closing disks 30 may be closer than the bottom ends of the closing disks 30. In some embodiments, the row unit 22 may include a single closing disk 30 that moves the soil into the trench 88.

The press wheel 32 is configured to compact the soil in the trench 88 and/or to further fill the trench 88 with the soil. The press wheel 32 is axially wider than the trench 88 such that the press wheel 32 contacts the first side of the trench 88 and the second side of the trench 88. As the press wheel 32 rolls over the trench 88, the press wheel 32 applies a downward force to the field 14 that compacts the soil. For example, to properly close the trench 88, the press wheel 32 compacts the soil in the trench 88 to be at generally the original ground level (e.g., the level of the soil on the first side and the second side of the trench 88). As illustrated, the press wheel 32 includes a press wheel sensor 89 that detects a vertical level of the press wheel 32 (e.g., the level of the soil at the first side and the second side of the trench 88). In certain embodiments, the press wheel 32 may detect a rotational value of the press wheel 32 (e.g., a number of rotations). The press wheel sensor 89 may output signals indicative of the vertical level or the rotations of the press wheel 32 to a controller (e.g., the work vehicle controller, the agricultural implement controller, or the row unit controller) of the trench detection system. The controller may determine the original ground level of the soil based on the signals received from the press wheel sensor 89. The original ground level may indicate the reference grade of the soil for a properly and sufficiently closed trench. In certain embodiments, the press wheel sensor 89 may be disposed on an arm coupled to the press wheel 32 or at another location of the row unit 22.

In certain embodiments, the closing disks 30 or the press wheel 32 may be omitted from the closing system such that the closing system of the row unit 22 includes a single stage (e.g., only the closing disks 30 or only the press wheel 32). Further, some embodiments of the single stage closing system may include closing disks disposed at angles other than those described above for the closing disks 30.

In some embodiments, the closing system may include closing wheels in addition to, or instead of, the closing disks 30 and/or the press wheel 32. The closing wheels may roll generally along the surface of the soil to at least partially close the trench by pushing soil into the trench. For example, the bottom ends of the closing wheels may be closer than the top ends of the closing wheels such that the closing wheels from a "V-press" (e.g., the closing wheels may form the point of the "V" at the bottom ends of the wheels). The point of the "V" (e.g., the bottom ends of the wheels) may generally point to the bottom of the trench. The pressure applied by the closing wheels to the soil may enable the closing wheels to close the trench (e.g., to move the soil into the trench from the sides of the trench). The closing wheels may be coupled to the chassis of the row unit by a closing wheel arm. In certain embodiments, the closing wheels may be positioned within the row unit 22 generally similar to the closing disks 30 and/or the press wheel 32.

The row unit 22 includes the actuators 64 (e.g., a first actuator 90 and a second actuator 91) that apply pressure to and/or adjust a relative position of the closing system (e.g., to the closing disks 30 and to the press wheel 32). The first actuator 90 is coupled to the closing disks 30 and includes a pneumatic cylinder. The second actuator 91 is coupled to the press wheel 32 and includes a spring. In certain embodiments, the first actuator 90 and/or the second actuator 91 may be other types of actuators (i.e., hydraulic cylinders, springs, pneumatic cylinders, hydro-pneumatic cylinders, etc.). The respective pressures applied by the first actuator 90 and the second actuator 91 may be adjustable. For example, the operator may manually change settings of the first actuator 90 and/or the second actuator 91 to adjust the respective applied pressures. In certain embodiments, the trench detection system may automatically change the pressures applied by the first actuator 90 and/or the second actuator 91 based upon the detected quality of the closure of the trench 88. For example, if the detected quality of the closure of the trench 88 is low, the controller of the trench detection system may output a signal to the first actuator 90 to increase the pressure applied to the closing disks 30. The increased pressure on the closing disks 30 may cause the closing disks 30 to displace additional soil from the sides of the trench 88 into the trench 88. As described above, the closing system may include closing wheels that at least partially close the trench. The row unit may include an actuator (e.g., the first actuator 90, the second actuator 91, or another actuator) coupled to the closing wheels that applies a pressure to and/or adjusts a relative position of the closing wheels.

As illustrated, the row unit 22 includes a third actuator 92 that may apply pressure to and/or adjust a relative position of the opening disks 84, the gauge wheels 85, the residue managers 87, or a combination thereof. The third actuator 92 is coupled to the linkage assembly 78 and includes a hydraulic cylinder. The pressure applied by the third actuator 92 may be adjustable. For example, the operator may manually change settings of the third actuator 92 to adjust the applied pressure. In certain embodiments, the trench detection system may automatically change the pressure applied by the third actuator based upon the detected quality of the closure of the trench 88. For example, if the detected quality of the closure of the trench 88 is high, the controller of the trench detection system may output a signal to the third actuator 92 to increase the pressure applied to the residue managers 87. The unacceptable high level of the trench 88 may be due to residue or clods. The increased pressure on the residue managers 87 may cause the residue managers 87 to displace additional soil (e.g., residue or clods) from in front of the opening disks 84 (e.g., may increase the aggressiveness of the residue managers 87).

The row unit 22 includes a tactile probe assembly 93. The tactile probe assembly 93 is configured to detect the quality of the closure of the trench 88 and output signals indicative of the quality of the closure. As illustrated, the tactile probe assembly 93 includes the sensor 34, a support 94, and a ground-engaging wheel 96. The support 94 is coupled to the row unit 22 adjacent to press wheel 32 and extends generally vertically above the trench 88. The ground-engaging wheel 96 extends out of the support 94 is configured to roll generally along a middle of the trench 88. In the illustrated embodiment, the sensor 34 is disposed within the support 94 and above the ground-engaging wheel 96. As the ground-engaging wheel 96 moves along the trench 88, the ground-engaging wheel 96 may move generally up and down within the support 94. As such, the ground-engaging wheel 96 may move the sensor 34 generally up and down. The sensor 34 may be a potentiometer or another type of sensor configured to detect the movement of the ground-engaging wheel 96. The sensor 34 may output signals to the controller of the trench detection system indicative of relative vertical positions and/or movements of the ground-engaging wheel 96 within the support 94. Based on the signals received from the sensor 34, the controller may compare the vertical positions of the ground-engaging wheel 96 to the original ground level of the soil to determine whether the trench 88 is properly closed. For example, the controller may determine the vertical positions of the ground-engaging wheel 96 to a reference grade and a tolerance range as described herein. In certain embodiments, the trench detection system may include all or portions of the row unit 22 as illustrated in FIG. 3.

Figure 4A:
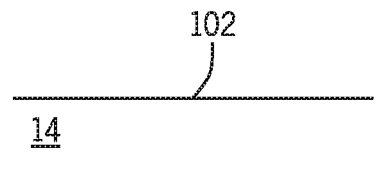
FIG. 4A is cross-sectional view of an original ground level of the field of FIG. 1, in accordance with an aspect of the present disclosure.

FIGS. 4A-4G illustrate various views and embodiments of the field 14 as components of the row unit pass over the field 14. For example, FIG. 4A is cross-sectional view of an original ground level 102 of the field 14 of FIG. 1. The original ground level 102 is the level of the soil of the field 14 prior to the row unit passing over the field 14.

Figure 4B:
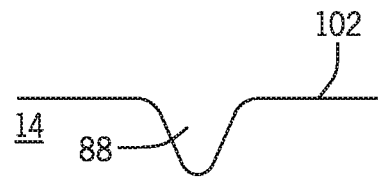
FIG. 4B is cross-sectional view of a trench in the field of FIG. 4A, in accordance with an aspect of the present disclosure.

FIG. 4B is cross-sectional view of the trench 88 in the original ground level 102 of FIG. 4A. As illustrated, the opening disks of the row unit have passed over and through the field 14 and have formed the trench 88. The soil at each side of the trench 88 is at the original ground level 102.

Figure 4C:
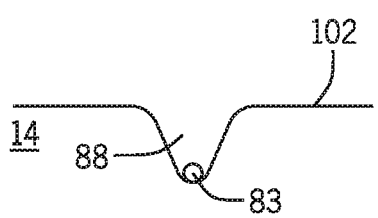
FIG. 4C is cross-sectional view of a seed disposed in the trench of FIG. 4B, in accordance with an aspect of the present disclosure.

FIG. 4C is cross-sectional view of a seed 83 disposed in the trench 88 of FIG. 4B. The seed delivery system of the row unit has deposited the seed 83 into the trench 88. As illustrated, the seed 83 is disposed at a bottom of the trench 88.

Figure 4D:
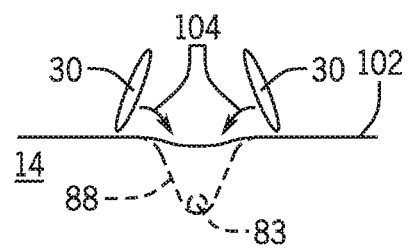
FIG. 4D is cross-sectional view of the trench of FIG. 4C in a closed position and closing discs disposed adjacent to the trench, in accordance with an aspect of the present disclosure.

FIG. 4D is cross-sectional view of the trench 88 of FIG. 4C in a closed position and the closing disks 30 disposed adjacent to the trench 88. The closing disks 30 have pushed the soil from each side of the trench 88 into the trench 88 and over the seed 83 as indicated by arrows 104. As such, the closing disks 30 have filled the trench 88 up to generally the original ground level 102.

Figure 4E:
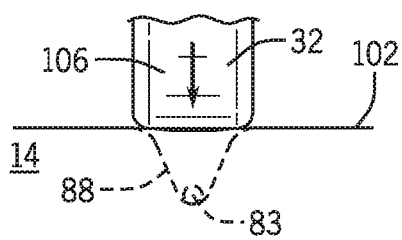
FIG. 4E is cross-sectional view of the trench of FIG. 4D in a compacted position and a press wheel disposed on the trench, in accordance with an aspect of the present disclosure.

FIG. 4E is cross-sectional view of the trench 88 of FIG. 4D in a compacted position and the press wheel 32 disposed on the trench 88. As illustrated, the press wheel 32 applies a force 106 generally downward toward the trench 88 as the press wheel 32 rolls over the trench 88. The compaction caused by the press wheel 32 further fills the trench 88 with soil and/or levels the soil in the trench 88.

Figure 4F:
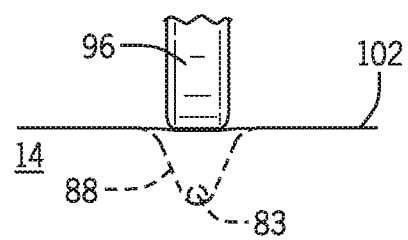
FIG. 4F is cross-sectional view of a ground-engaging wheel disposed on the properly closed trench of FIG. 4E, in accordance with an aspect of the present disclosure.

FIG. 4F is cross-sectional view of the ground-engaging wheel 96 disposed on the properly closed trench 88 of FIG. 4E. The closing disks and/or the press wheel have properly closed the trench 88 such that the soil in the trench 88 is at generally the same level compared to the original ground level 102. As such, the ground-engaging wheel 96 is positioned generally at the original ground level 102. The sensor coupled to the ground-engaging wheel 96 may detect the position of the ground-engaging wheel 96 at the original ground level 102 and may output a corresponding signal to a controller of the trench detection system. The controller may determine that the closure of the trench 88 is acceptable. As discussed herein, the properly closed trench 88 of FIG. 4F may enhance the ability of the seed 83 to germinate and emerge and/or may increase a yield of the crop produced from the seed 83.

Figure 4G:
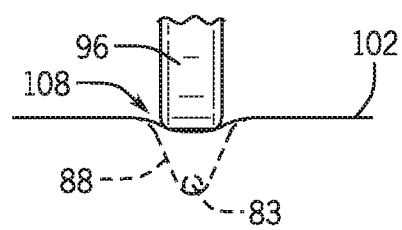
FIG. 4G is cross-sectional view of the ground-engaging wheel disposed on an improperly closed trench, in accordance with an aspect of the present disclosure.

FIG. 4G is cross-sectional view of the ground-engaging wheel 96 disposed on an improperly closed trench 88. As illustrated, the closing disks and/or the press wheel have improperly closed the trench 88 such that a depression 108 is formed in the trench 88. The depression 108 is generally lower than the original ground level 102. As such, the ground-engaging wheel 96 is positioned generally in the depression 108 and lower than the original ground level 102. The sensor coupled to the ground-engaging wheel 96 may detect the position of the ground-engaging wheel 96 at the level of the depression 108 and may output a corresponding signal to a controller of the trench detection system. The controller may determine that the closure of the trench 88 is unacceptable. As discussed herein, the improperly closed trench 88 of FIG. 4G may decrease the germination and emergence rate of the seed 83. The controller may notify the operator of the improperly closed trench 88 and/or may perform a control operation to correct the improperly closed trench 88.

Figure 5A:
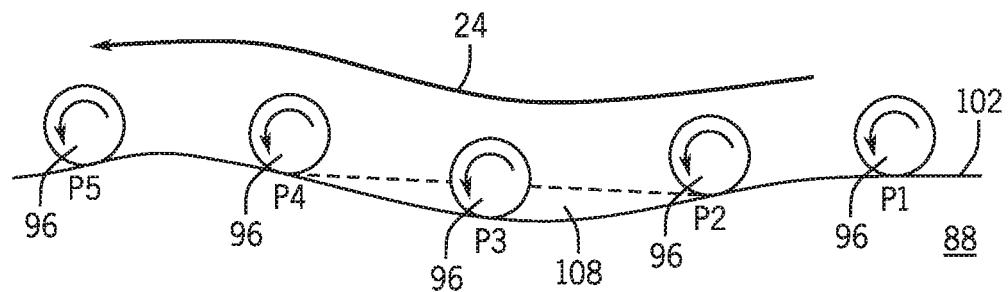
FIG. 5A is a side view of the ground-engaging wheel disposed at positions along the trench of FIG. 3, in accordance with an aspect of the present disclosure.

FIG. 5A is a side view of the ground-engaging wheel 96 disposed at positions P1-P5 along the trench 88 of FIG. 3. As described herein, the direction 24 is the direction in which the work vehicle tows the agricultural implement and the row units. As the ground-engaging wheel 96 rolls along the trench 88 in the direction 24 from the positions P1-P5, the ground-engaging wheel 96 detects the depth of the soil generally over the seeds and within the trench 88. The ground-engaging wheel 96 begins at the position P1 which is generally at the original ground level 102. At the next position, position P2, the ground-engaging wheel 96 is slightly lower than the original ground level 102 and is at the edge of the depression 108. Next, the ground-engaging wheel 96 is at the position P3 at a bottom of the depression 108. At position P4, the ground-engaging wheel 96 has exited the depression 108. At position P5, the ground-engaging wheel 96 is back at the original ground level 102. In certain embodiments, the ground-engaging wheel 96 may be disposed at other generally vertical positions along the trench 88.

Figure 5B:
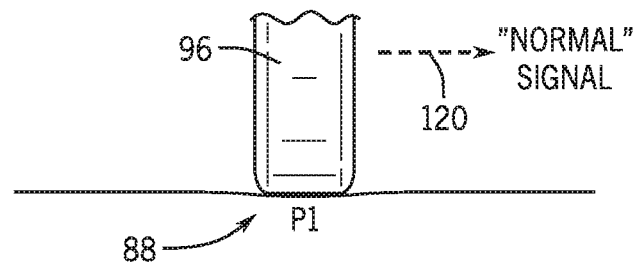
FIG. 5B is a rear view of the ground-engaging wheel of FIG. 5A disposed at the original ground level of the trench, in accordance with an aspect of the present disclosure.

At each of the positions P1-P5, the sensor coupled to the ground-engaging wheel 96 may output signals indicative of the vertical level of the ground-engaging wheel 96 to a controller of the trench detection system. For example, FIG. 5B is a rear view of the ground-engaging wheel 96 of FIG. 5A disposed at the position P1. The position P1 is at the original ground level 102 of the trench 88. As such, the sensor coupled to the ground-engaging wheel 96 outputs a signal 120 indicative of normal/acceptable closure of the trench 88. The signal 120 may be received at the controller of the trench detection system. In certain embodiments, the signal 120 may pass through a filter before being received at the controller. Based on the signal 120, the controller may output signals to notify the operator of the normal/acceptable closure.

Figure 5C:
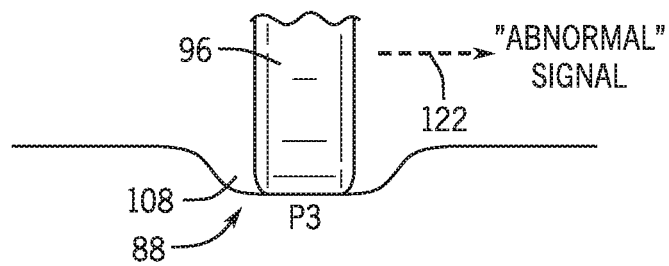
FIG. 5C is a rear view of the ground-engaging wheel of FIG. 5A disposed at a depression of the trench, in accordance with an aspect of the present disclosure.

FIG. 5C is a rear view of the ground-engaging wheel 96 of FIG. 5A disposed at the position P3. The position P3 is at the depression 108 of the trench 88. As such, the sensor coupled to the ground-engaging wheel 96 outputs a signal 122 indicative of abnormal/unacceptable closure of the trench 88. The signal 122 may be received at the controller of the trench detection system. Based on the signal 122, the controller may output signals to notify the operator of the abnormal/unacceptable closure and/or to perform a control operation at the row unit (e.g., at the closing disks or at the press wheel).

Figure 6:
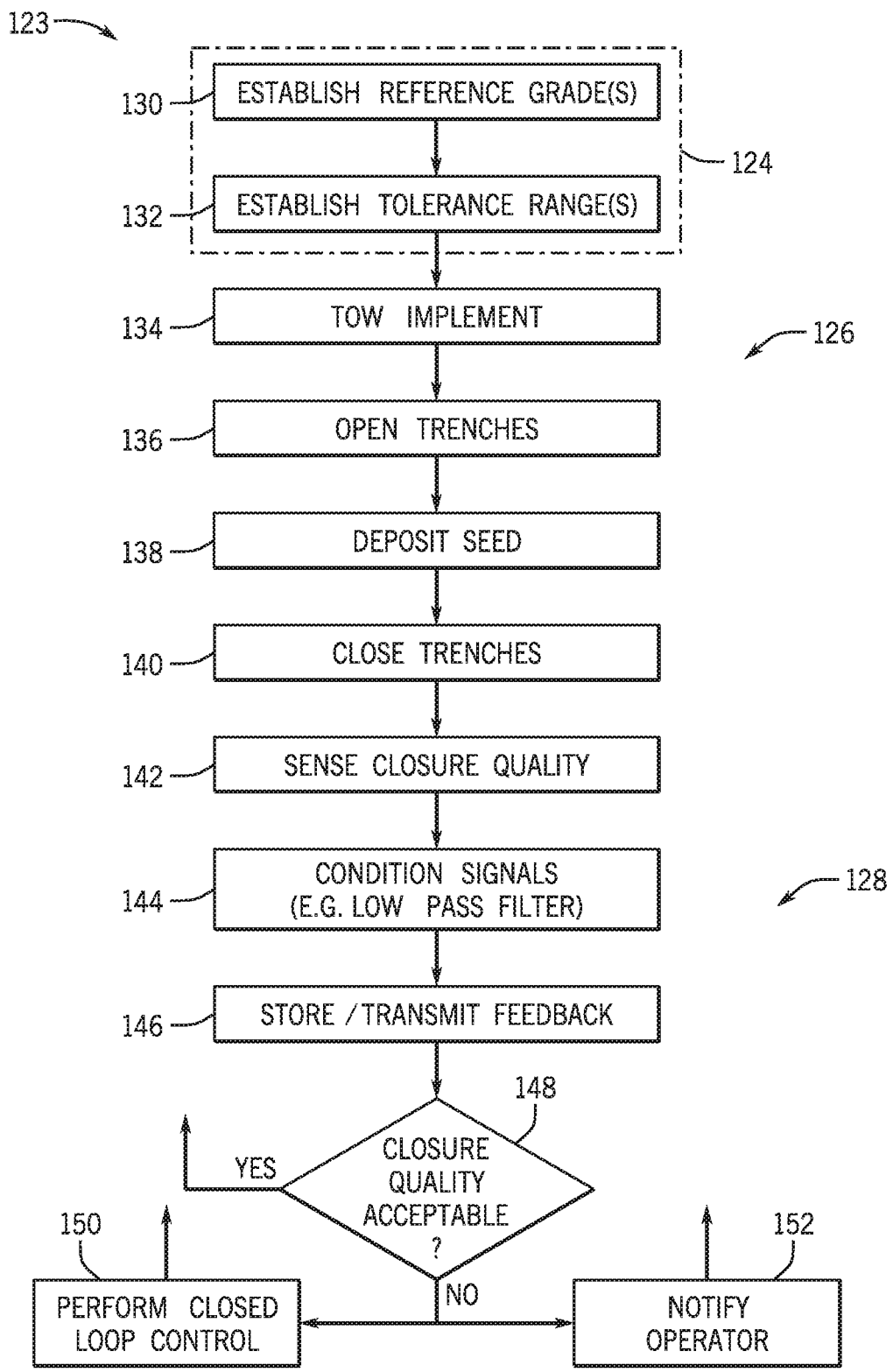
FIG. 6 is a flowchart of a method for the trench detection system of FIG. 1, in accordance with an aspect of the present disclosure.

FIG. 6 is a flowchart of a method 123 for the trench detection system of FIG. 1. As illustrated, the method 123 includes a setup phase 124, an operational phase 126, and a sensing and control phase 128. In certain embodiments, the method 123 may include more or fewer phases to implement the trench detection system. The setup phase 124 includes blocks 130 and 132. At block 130, reference grade(s) are established. For example, the reference grade(s) may include the original ground level as determined by the controller of the trench detection system. As described herein, the controller may determine the reference grade(s) based on the signal received from the press wheel sensor. At block 132, tolerance range(s) are established. The tolerance range(s) may include range(s) relative to the reference grade(s) and may be used by the controller to perform certain control operations. The tolerance range(s) may be provided/selected by the operator and/or may be automatically be determined by the controller. For example, a reference grade may be established as the original ground level, and a tolerance range may be established as +1 cm/−1 cm relative to the original ground level. In certain embodiments, the reference grade(s) and/or the tolerance range(s) may include other values. The reference grade(s) and the tolerance range(s) are compared by the controller to measured values detected by the tactile probe assembly to determine whether certain control operations should be performed the trench detection system or whether certain measurements/alerts should be reported to the operator.

The operational phase 126 includes blocks 134, 136, 138, and 140. At block 134, the work vehicle tows the agricultural implement through the field. As the work vehicle tows the agricultural implement, the row units of the agricultural implement engage the soil of the field. For example, at block 136, the opening disks of the row units engage the soil to open the trenches in the field. At block 138, the row units deposit the seeds into the trenches. At block 140, the closing disks push the soil into the trenches to close the trenches, and the press wheel rolls over the trenches to compact the soil and to detect the references grade(s) (e.g., the original ground level).

The control and monitoring phase 128 includes blocks 142, 144, 146, 148, 150, and 152. At block 142, the trench detection system detects the quality of the trench closure. For example, the trench detection system may detect the quality of the trench closure via the tactile probe assembly. The detection by the tactile probe assembly may be periodic, based on a user input, in response to a triggering event, or a combination thereof. The sensor of the tactile probe assembly may output signals to the controller of the trench detection system indicative of the quality of the trench closure. At block 144, the signals output by the sensor are conditioned. For example, a low pass filter may condition the signals for receipt by the controller of the trench detection system. At block 146, the signals are received at the controller and the values indicated by the signals are stored the memory of the controller. The values are also transmitted to the processor of the controller.

At block 148, the controller determines whether the quality of the closure of the trench is normal/acceptable. For example, the controller may compare the values indicative of the quality of the closure, as received from the tactile probe assembly, to the reference grade(s) and tolerance range(s) previously established in the setup phase 124. If the controller determines that the quality of the closure is acceptable (e.g., the value is within the tolerance range relative to the reference grade), the method 123 returns to a previous block (i.e., to one of the blocks 130-142). If the controller determines that the quality of the closure is unacceptable (e.g., the value is not within the tolerance range relative to the reference grade), the method 123 proceeds to blocks 150 and 152. At block 150, the controller performs closed loop control of certain components of the respective row unit. For example, the controller may output signals to the respective row unit to adjust a pressure applied to the closing system and/or to the press wheel of the respective row unit. At block 152, in addition to or independent of block 150, the trench detection system notifies the operator of the unacceptable quality of the trench closure. For example, the controller may output signals to the user interface to provide user-detectable alerts for viewing by the operator. After completing the blocks 150 and/or 152, the method 123 may return to a previous block (i.e., to one of the blocks 130-142).

In certain embodiments, the trench detection system described herein may enable the work vehicle, the agricultural implement, the operator, a combination thereof, to improve the closure quality of the trenches formed by the agricultural implement. For example, after the deposition of the seeds into the trenches, the trench detection system may determine whether the trench was properly closed. In response to the determination, the trench detection system may notify the operator of the quality of the closure and/or may perform a closed loop control operation at the respective row unit to improve the quality of the closure. As described herein, the quality of the closure of the trench over the seeds may affect crop yields from the seeds. As such, the ability of the trench detection system to determine the quality of the trench closure, to notify the operator, and to perform the closed loop control operation enables the trench detection system to improve crop yields. Improved crop yields may provide increased profits for the operator of the trench detection system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A trench detection system for an agricultural implement, comprising:
   a row unit configured to form a trench in soil, to deposit an agricultural product in the trench, and to at least partially close the trench after deposition of the agricultural product; and
   a tactile probe assembly comprising:
   a wheel configured to engage a surface of the soil at the trench and to move vertically due to variations in a depth of the surface of the soil at the trench relative to an original ground level of the soil, wherein the wheel is disposed behind a press wheel of the row unit; and
a sensor configured to detect vertical movement of the wheel and to generate a signal indicative of the depth of the surface of the soil at the trench relative to the original ground level of the soil.

2. The trench detection system of claim 1, wherein the depth of the surface of the soil below the original ground level of the soil is indicative of unacceptable closure of the trench.

3. The trench detection system of claim 1, wherein the row unit comprises a closing system that contacts the soil to displace the soil to close the trench.

4. The trench detection system of claim 3, wherein the closing system comprises a single stage closing system.

5. The trench detection system of claim 3, wherein the closing system comprises a pair of closing disks followed by the press wheel.

6. The trench detection system of claim 1, comprising a controller that, in operation, receives the signal and performs a control operation, a reporting operation, or both, based upon the signal.

7. The trench detection system of claim 6, wherein the controller comprises a user interface in a vehicle cab that, in operation, produces a user-detectable indication of the depth of the surface of the soil at the trench.

8. The trench detection system of claim 6, wherein the control operation comprises a command from the controller to alter operation of the agricultural implement or of a vehicle towing the agricultural implement in response to the depth of the surface of the soil at the trench.

9. The trench detection system of claim 1, comprising a plurality of similar row units, each row unit of the plurality of similar row units comprising a respective tactile probe assembly to detect a depth of the surface of the soil relative to the original ground level of the soil at a respective trench formed by the row unit.

10. A trench detection system for an agricultural implement comprising:
a plurality of row units configured to form a respective plurality of trenches in soil, to deposit agricultural product in the respective plurality of trenches, and to at least partially close the respective plurality of trenches after deposition of the agricultural product;
a plurality of tactile probe assemblies, wherein each tactile probe assembly of the plurality of tactile probe assemblies comprises:
a wheel configured to engage a surface of the soil at a respective trench of the plurality of trenches and to move vertically due to variations in a depth of the surface of the soil at the respective trench relative to an original ground level of the soil, wherein the wheel is disposed behind a press wheel of a respective row unit of the plurality of row units; and
a sensor configured to detect vertical movement of the wheel and to generate a signal indicative of the depth of the surface of the soil at the respective trench relative to the original ground level of the soil; and
a controller that, in operation, receives the signals from the plurality of tactile probe assemblies and displays in a vehicle cab a user-detectable indication of one or more of the depths of the surface of the soil at one or more respective trenches of the plurality of trenches.

11. The trench detection system of claim 10, wherein each row unit of the plurality of row units comprises a pair of closing disks and the press wheel.

12. The trench detection system of claim 11, wherein, in response to receiving a signal indicative of an unacceptable depth of the surface of the soil relative to the original ground level of the soil from a tactile probe assembly of the plurality of tactile probe assemblies, the controller is configured to output a control signal to adjust a pressure applied by the pair of closing disks of a row unit of the plurality of row units associated with the tactile probe assembly to the soil.

13. The trench detection system of claim 11, wherein, in response to receiving a signal indicative of an unacceptable depth of the surface of the soil relative to the original ground level of the soil from a tactile probe assembly of the plurality of tactile probe assemblies, the controller is configured to adjust a pressure applied by the press wheel of a row unit of the plurality of row units associated with the tactile probe assembly to the soil.

14. The trench detection system of claim 10, wherein each tactile probe assembly of the plurality of tactile probe assemblies is configured to detect and communicate the respective depth of the surface of the soil relative to the original ground level of the soil periodically as the agricultural implement travels over the soil.

15. The trench detection system of claim 10, wherein the user-detectable indication of the one or more depths of the surface of the soil relative to the original ground level of the soil at the one or more respective trenches of the plurality of trenches comprises an alert on a display, a map of a field representative of the one or more respective trenches, or a combination thereof.

16. The trench detection system of claim 10, wherein at least one tactile probe assembly of the plurality of tactile probe assemblies is configured to generate the signal indicative of the depth of the surface of the soil at a middle of the respective trench, and the controller is configured to determine a quality of closure of the respective trench as a function of the depth of the surface of the soil at the middle of the respective trench compared to a depth of a side of the respective trench.

17. A trench detection system for an agricultural implement, comprising:
a row unit comprising:
a residue management system configured to conform soil;
an opening system behind the residue management system, wherein the opening system is configured to form a trench in the soil; and
a press wheel behind the opening system, wherein the press wheel is configured to at least partially close the trench after deposition of an agricultural product in the trench;
a tactile probe assembly comprising:
a wheel configured to engage a surface of the soil at the trench and to move vertically due to variations in a depth of the surface of the soil at the trench relative to an original ground level of the soil, wherein the wheel is disposed behind the press wheel; and
a sensor configured to detect vertical movement of the wheel and to generate a signal indicative of the depth of the surface of the soil at the trench relative to the original ground level of the soil; and
a controller configured to receive the signal from the tactile probe assembly and, in response, perform a control operation, a monitoring operation, or both.

18. The trench detection system of claim 17, wherein the control operation comprises an adjustment to the residue management system, the opening system, the press wheel, or a combination thereof.

19. The trench detection system of claim 17, wherein the row unit comprises a pair of closing disks, and the control operation comprises decreasing a gap between the pair of closing disks.

\* \* \* \* \*